US009362735B2

(12) United States Patent
Cypers et al.

(10) Patent No.: US 9,362,735 B2
(45) Date of Patent: Jun. 7, 2016

(54) FEED CHAIN FOR A SYNCHRONOUS ELECTRIC MACHINE, ELECTRIC TRACTION SYSTEM COMPRISING SUCH A CHAIN, AND CONTROL METHOD FOR SUCH A CHAIN

(71) Applicant: Alstom Transport SA, Levallois-Perret (FR)

(72) Inventors: David Cypers, Odos (FR); Olivier Giacomoni, Milan (IT); Sebastien Belin, Espouey (FR); Guillaume Desportes, Maubourguet (FR)

(73) Assignee: ALSTOM TRANSPORT TECHNOLOGIES, Levallois-Perret (FR)

( * ) Notice: Subject to any disclaimer, the term of this patent is extended or adjusted under 35 U.S.C. 154(b) by 208 days.

(21) Appl. No.: 13/781,067

(22) Filed: Feb. 28, 2013

(65) Prior Publication Data

US 2013/0229732 A1     Sep. 5, 2013

(30) Foreign Application Priority Data

Mar. 2, 2012   (FR) ...................................... 12 51937

(51) Int. Cl.
*H02H 3/08*   (2006.01)
*H02H 7/08*   (2006.01)
(Continued)

(52) U.S. Cl.
CPC .............. *H02H 3/083* (2013.01); *B60L 3/0061* (2013.01); *B60L 3/0069* (2013.01); *B60L 3/04* (2013.01); *B60L 11/1803* (2013.01); *B60L 15/007* (2013.01); *H02H 7/065* (2013.01); *H02H 7/0805* (2013.01); *H02H 9/041* (2013.01); *B60L 2200/26* (2013.01); *B60L 2220/14* (2013.01); *B60L 2240/425* (2013.01); *Y02T 10/644* (2013.01); *Y02T 10/645* (2013.01); *Y02T 10/7005* (2013.01)

(58) Field of Classification Search
USPC ................................................... 361/1, 23, 31
See application file for complete search history.

(56) References Cited

U.S. PATENT DOCUMENTS 4,054,943 A    10/1977  Mundt
4,806,839 A *   2/1989  Nagato et al. .................. 318/798
(Continued)

FOREIGN PATENT DOCUMENTS

CN    2128627       3/1993
FR    2906194       3/2008
JP    2007189763    7/2007

OTHER PUBLICATIONS

Search Report for Corresponding EP Application 13157305.7.

*Primary Examiner* — Kawing Chan
(74) *Attorney, Agent, or Firm* — Davidson, Davidson & Kappel, LLC (57) ABSTRACT

A feed chain (16) has M feed outputs (31) for supplying a synchronous electric machine (14) with M phases. The feed chain comprises: a converter (22) for converting a direct input current into a polyphase alternating current; a storage bank; a detector (30) for detecting a short-circuit outside or inside the electric machine (14), a device (26) for insulating the electric machine (14) from overvoltages and/or overcurrents of the polyphase alternating current, and a controller (28) for controlling the converter (22) and the insulating device (26). The feed chain (16) includes short-circuiting device (27) capable of connecting the M power supply outputs (31) to each other, the controller (28) being capable of commanding the short-circuiting device (27) to perform that operation.

8 Claims, 4 Drawing Sheets

(51) Int. Cl.
*H02H 7/06* (2006.01)
*H02H 9/04* (2006.01)
*B60L 3/00* (2006.01)
*B60L 3/04* (2006.01)
*B60L 11/18* (2006.01)
*B60L 15/00* (2006.01)

(56) References Cited

U.S. PATENT DOCUMENTS

| | | | |
|---|---|---|---|
| 5,177,416 A * | 1/1993 | Inaji et al. | 318/400.11 |
| 6,153,993 A * | 11/2000 | Oomura et al. | 318/434 |
| 6,278,256 B1 * | 8/2001 | Aoyama | 318/801 |
| 6,965,206 B2 * | 11/2005 | Kamen et al. | 318/139 |
| 7,049,787 B2 * | 5/2006 | Knapp et al. | 318/801 |
| 7,218,070 B2 * | 5/2007 | Ylitalo | 318/376 |
| 7,227,325 B1 * | 6/2007 | Talja et al. | 318/434 |
| 7,612,972 B2 * | 11/2009 | Battani et al. | 361/42 |
| 7,759,891 B2 * | 7/2010 | Serizawa et al. | 318/434 |
| 8,049,455 B2 * | 11/2011 | Kitanaka | 318/563 |
| 2007/0030606 A1 * | 2/2007 | Ganev et al. | 361/23 |
| 2008/0055799 A1 * | 3/2008 | Serizawa et al. | 361/24 |
| 2010/0036555 A1 * | 2/2010 | Hosoda et al. | 701/22 |
| 2010/0076638 A1 * | 3/2010 | Kitanaka | 701/22 |
| 2011/0043152 A1 * | 2/2011 | Kidokoro et al. | 318/490 |
| 2011/0316460 A1 | 12/2011 | Yasuoka et al. | |
| 2013/0026968 A1 * | 1/2013 | Tagome et al. | 318/724 |
| 2013/0221888 A1 * | 8/2013 | Horikoshi et al. | 318/400.29 |
| 2013/0271056 A1 * | 10/2013 | Bunte et al. | 318/503 |

\* cited by examiner

FEED CHAIN FOR A SYNCHRONOUS ELECTRIC MACHINE, ELECTRIC TRACTION SYSTEM COMPRISING SUCH A CHAIN, AND CONTROL METHOD FOR SUCH A CHAIN

Priority is hereby claimed to FR Patent Application No. 12 51937 filed on Mar. 2, 2012, the entire disclosure of which is hereby incorporated by reference herein.

The present invention relates to a feed chain having M feed outputs for supplying a synchronous electric machine with M phases.

BACKGROUND

A feed chain of the aforementioned type is known. When a short-circuit appears inside or outside the electric machine, an overvoltage or overcurrent of the feed current is detected. If the short-circuit is outside the electric machine, one commonly adopted solution consists of using the control means to command the opening of the switches of the insulating device. This solution makes it possible to insulate the electric machine from the feed chain and thereby protect it from the overvoltage or overcurrent that has been detected.

However, if the short-circuit is inside the electric machine, significant pulsed torques as well as short-circuit currents are created within the electric machine. Opening the insulating device is then not enough to reduce the amplitude of those pulsed torques and currents sufficiently. The electric machine is in fact driven by the wheels of the train in which it is installed, thereby operating in "alternator" mode. The pulsed torques as well as the short-circuit currents created then risk leading to unwanted phenomena, for example such as an axle locking.

SUMMARY OF THE INVENTION

An object of the present invention is therefore to propose a feed chain for an electric machine making it possible to reduce the amplitude of the pulsed torques and short-circuit currents created within the electric machine, during the appearance of a short-circuit inside the electric machine.

In accordance with an embodiment of the present invention, a feed chain having M feed outputs for supplying a synchronous electric machine with M phases is provided. The feed chain comprises: a converter for converting a direct input current into a polyphase alternating output current including a plurality M of phases, the converter comprising two input terminals and M output terminals, and capable of delivering the polyphase alternating current to said electric machine; a storage bank including at least one storage capacitor arranged between the input terminals of the converter; a detector for detecting an outside short-circuit; an insulator device for insulating the electric machine from overvoltages and/or overcurrents of the polyphase alternating current, the insulating device being arranged between the converter and the M feed outputs, and including a plurality M of branches, each branch including at least one electric switch for disconnecting the considered phase, arranged between the converter and one of the M outputs; and a controller for controlling the converter and the insulating device, wherein the detector can also detect a short-circuit inside the electric machine, the feed chain also including a short-circuiting device capable of connecting the M power supply outputs to each other, the controller being capable of commanding the short-circuiting device to perform that operation.

According to other embodiments, the feed chain comprises one or more of the following features, considered alone or according to all technically possible combinations:

the short-circuiting device is arranged between the converter and the M power supply outputs;

the short-circuiting device includes M electronic switches, and each switch has three possible switching states;

the short-circuiting device is arranged between the storage bank and the converter;

the controller and the detector share a same computer situated within the controller; the number M of phases is equal to three.

The invention also relates to an electric traction system comprising a synchronous electric machine and a feed chain of the machine, wherein the feed chain is as defined above.

The invention also relates to a control method for a feed chain of the aforementioned type, comprising a step for detecting a short-circuit outside or inside the electric machine, wherein, if the short-circuit detected during the detection step is inside the electric machine, it comprises a step for short-circuiting, using the short-circuiting means, the M phases of the electric machine, by electrical connection between the M power supply outputs of the chain.

BRIEF DESCRIPTION OF THE DRAWINGS

These characteristics and advantages of the invention will appear upon reading the following description, provided solely as a non-limiting example, and done in reference to the appended drawings, in which.

DETAILED DESCRIPTION OF THE PREFERRED EMBODIMENTS

Figure 1:
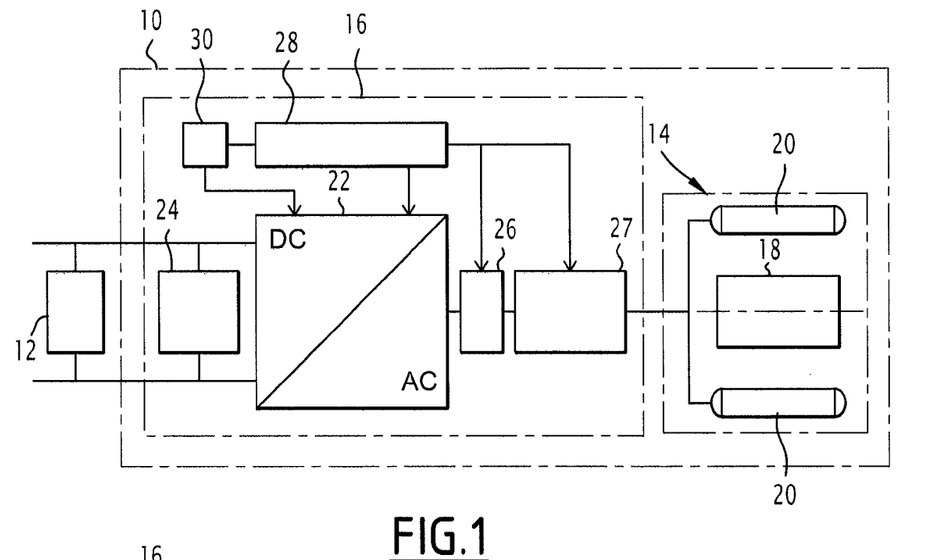
FIG. 1 is a diagrammatic illustration of a traction system according to the invention, connected to a direct voltage source, comprising a feed chain according to a first embodiment and a synchronous electric machine.

In FIG. 1, an electric traction system 10, installed onboard a rail vehicle, is connected to a direct voltage source 12. The direct voltage source 12 is for example a catenary, connected to an electric network. The direct voltage source 12 delivers a rated output voltage with a value above 600 V, for example equal to 3 kV.

The electric traction system 10 comprises a synchronous electric machine 14 and a feed chain 16 of the machine according to a first embodiment. The feed chain 16 is connected to the direct voltage source 12 to power it.

The electric machine 14 includes a rotor 18 and a stator 20. The rotor 18 comprises permanent magnets. The stator 20 comprises windings designed to be supplied by the feed chain 16. The electric machine 14 is, for example, a polyphase synchronous electric motor with permanent magnets. The electric machine 14 for example has a rated power comprised between 50 kW and 2 MW.

The feed chain 16 comprises a converter 22 converting a direct input current into a polyphase alternating output current, the converter 22 being arranged at the output of the direct voltage source 12. It also comprises a storage bank 24 arranged between the direct voltage source 12 and the converter 22, and an insulating device 26, arranged at the output of the converter.

The feed chain 16 also comprises a short-circuiting device 27 for short-circuiting the phases of the electric machine 14, arranged between the insulating device 26 and the electric machine 14, and a controller 28 for controlling the converter 22, the insulating device 26 and the short-circuiting device 27. It also comprises a detector 30 for detecting a short-circuit outside or inside the electric machine. The feed chain 16 has M supply outputs 31, M being an integer.

The converter 22 includes a positive input terminal 34A, a negative input terminal 34B, and M output terminals 36. Each output terminal 36 corresponds to a respective phase of the polyphase alternating output current that can be delivered by the converter 22.

Figure 2:
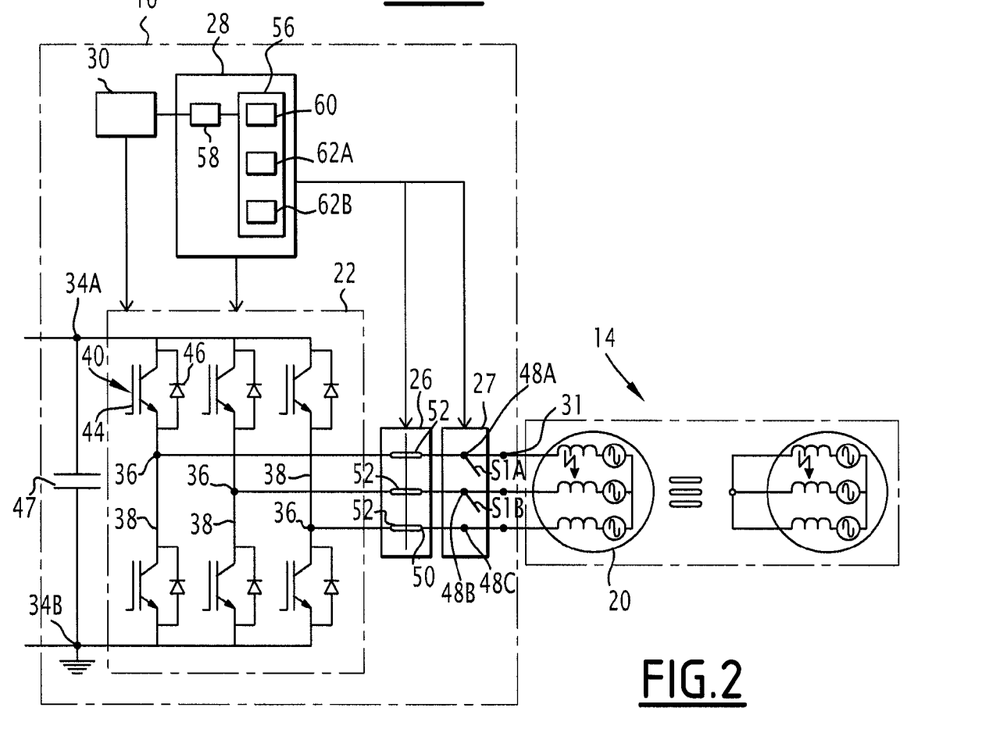
FIG. 2 is an electrical diagram of the feed chain of FIG. 1, when the electric machine of FIG. 1 is supplied with current.

In the example embodiment of FIG. 2, the number M of outputs 31, output terminals 36 and phases is equal to three. In the same example embodiment, the converter 22 is a two-level three-phase inverter. Alternatively, the converter 22 is a three-level inverter. The inverter 22 comprises a switching branch 38 for each output terminal 36 corresponding to a respective phase A, B, C.

Each switching branch 38 is connected between the first input terminal 34A and the second input terminal 34B. Each switching branch 30 comprises two electric switches 40 connected serially and in the same direction, and connected to each other by a midpoint, each midpoint forming an output terminal 36 corresponding to a respective phase A, B, C of the output current.

As is known in itself, each electric switch 40 is a two-way current and one-way voltage switch. Each electric switch 40 comprises a transistor 44 and a diode 46 connected in antiparallel, thereby ensuring two-way current circulation paths when the transistor 44 is on.

All of the electric switches 40 are, for example, identical. The transistor 44 is for example an insulated gate bipolar transistor (IGBT). The gate of each transistor 44 is connected to the control means 28 to receive a corresponding control signal.

Alternatively, each electric switch 40 comprises a number N of transistors 44 serially connected in the same direction, as well as a number N of diodes 46, each diode 46 being connected in antiparallel with the transistor 44, N being an integer greater than or equal to two.

The storage bank 24 for example comprises a storage capacitor 47 connected between the two input terminals 34A, 34B.

The insulating device 26 is capable of insulating the electric machine 14 from the feed chain 16 in case of overvoltage and/or overcurrent of the polyphase alternating current. In the example embodiment, the insulating device 26 is a vacuum tube insulating device, made according to the teaching of the patent application filed under number FR 2 906 194 on Sep. 21, 2006 by the company Alstom Transport S.A.

The insulating device 26 comprises M switching branches 50. In the example embodiment of FIG. 2, the insulating device 26 includes three switching branches 50. Each switching branch 50 includes an electric switch 52 for disconnecting the corresponding phase. Each switch 52 has two simultaneous states: an open state and a closed state, and is connected to the controller 28 to receive the same control signal. Each output 36 is connected to an electric switch 52.

Alternatively, each switching branch 50 has a number P of electric disconnecting switches 52 connected serially, P being an integer greater than or equal to two.

The short-circuiting device 27 can connect the M outputs 31 to each other, each one corresponding to a phase of the electric machine 14. The short-circuiting device is, in this example, a two-state contactor with traditional air disconnect, according to technology known in itself. Alternatively, the short-circuiting device may be a two-state disconnect contactor with vacuum tube, as described with respect to FIG. 2 of document FR 2 906 194. The contactor 27 is arranged between the insulating device 26 and the power supply outputs 31.

The contactor 27 has M switching terminals 48. In the example embodiment of FIG. 2, the contactor 27 has three switching terminals 48: a first switching terminal 48A, a second switch terminal 48B, and a third switching terminal 48C. Each output 31 is connected to a switching terminal 48A, 48B, 48C of the contactor 27.

A switch S1A is arranged between the terminals 48A, 48B, and a switch S1B is arranged between the terminals 48B, 48C.

Each switch S1A, S1B has two simultaneous states: an open state and a closed state.

In its closed state, the switch S1A can connect the first switching terminal 48A to the second switching terminal 48B, and thereby connect the phases A and B of the electric machine 14. In its open state, the switch S1A is capable of insulating the output potentials of the phases A and B of the electric machine 14 from each other.

In its closed state, the switch S1B can connect the second switching terminal 48B to the third switching terminal 48C, and thereby connect the phases B and C of the electric machine 14. In its open state, the switch S1B is capable of insulating the output potentials of the phases B and C of the electric machine 14 from each other.

Each switch S1A, S1B is connected to the controller 28 to receive a same control signal.

Alternatively, the contactor 27 is replaced by any switching device having two positions: a first position capable of insulating the M phases of the electric machine 14 from each other, and a second position capable of connecting the M phases of the electric machine 14 from their input point.

The controller 28 is connected to each of the electric switches 40, S1A, S1B, 52, as previously indicated. They are thus prepared to send control signals to the converter 22, the insulating device 26 and the contactor 27.

The controller 28 may include a computer for example made up of a memory 56 and a data processor 58.

The memory 56 comprises a control law and software 60 for applying the control signals.

The control law can calculate control instructions and transmit instructions to the software 60. To that end, it comprises several control instructions including an instruction 62A to close each switch S1A, S1B, an instruction 62B to open each switch S1A, S1B, as well as instructions to close or open switches 52.

As is known in itself, the software 60 can apply control instructions from the control law. In particular, the application of the instruction 62A makes it possible to command closing of the switches S1A, S1B when a short-circuit occurs inside the electric machine 14. The application of the instruction 62B makes it possible to command opening of the switches S1A, S1B, under normal usage conditions of the electric traction system 10.

The data processor 58 can select control instructions situated inside the control law, as a function of a determined event.

Alternatively, the controller 28 can be made in the form of programmable logic components, or are in the form of dedicated integrated circuits.

The detector 30 is connected to the switching branches 38 of the converter 22. They are also, for example, connected to the computer installed in the control means 28.

The detector 30 is capable of detecting a short-circuit outside or inside the electric machine 14 by measuring currents circulating in the switching branches 38 of the converter 22 and/or by measuring the temperature of the air inside the motor. To perform these measurements, the detector 30 may comprise voltage sensors and/or temperature sensors. In the case of a temperature detection, not shown in the figures, the detector 30 is connected to the electric machine 14.

They are capable of transmitting detection information regarding a short-circuit to the computer located in the controller 28.

The operation of the feed chain 16 will now be explained using FIGS. 2 to 5.

In the initial configuration shown in FIG. 2, the switches 52 are closed, and the switches S1A, S1B are open. The converter 22 and the electric machine 14 are electrically connected via the insulating device 26 and the contactor 27. An alternating current is delivered by the converter 22 to the stator 20 of the electric machine 14 on each of its phases A, B, C.

Figure 5:
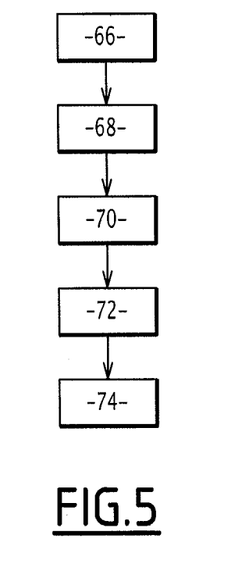
FIG. 5 is a flowchart showing a control method for a feed chain according to the invention.

When an electrical defect inside or outside the electric machine 14, such as a short-circuit for example, occurs, in step 66 the detector 30 detects an overcurrent in the currents circulating in the switching branches 38 of the converter 22. Step 66 is shown in FIG. 5.

In the following step 68, the processor 58 then selects, within the control law, an instruction to open the switches 52. The software 60 executes that instruction to open the switches 52.

Figure 3:
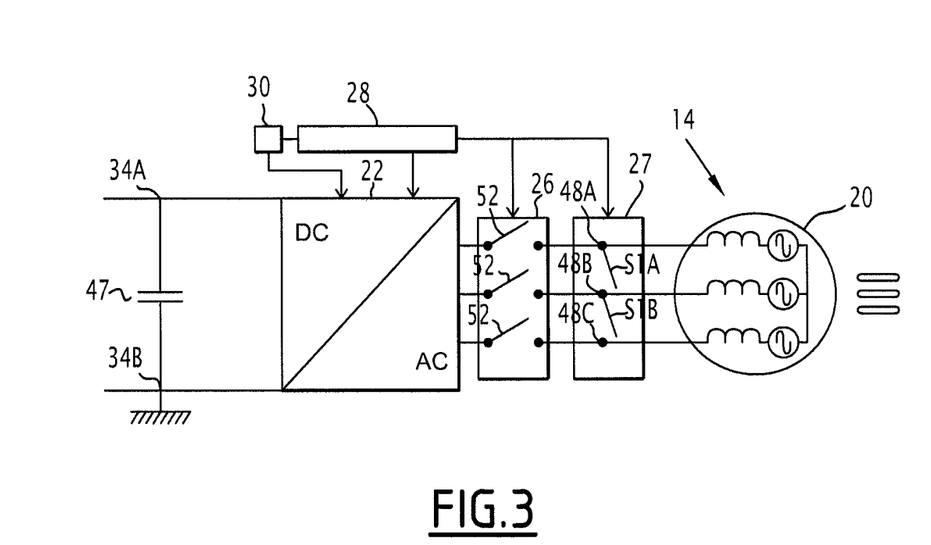
FIG. 3 is a diagrammatic illustration of the feed chain of FIG. 1, during an electrical insulation step between the electric machine and the feed chain.

As illustrated by FIG. 3, in the step 70, the switches 52 open, and the switches S1A, S1B remain open. The electric machine 14 is then electrically insulated from the feed chain 16.

In the following step 72, if the short-circuit is inside the electric machine 14, the processor 58 selects the instruction 62A within the control law to close the switches S1A, S1B of the contactor 27. The software 60 executes said instruction 62A.

Figure 4:
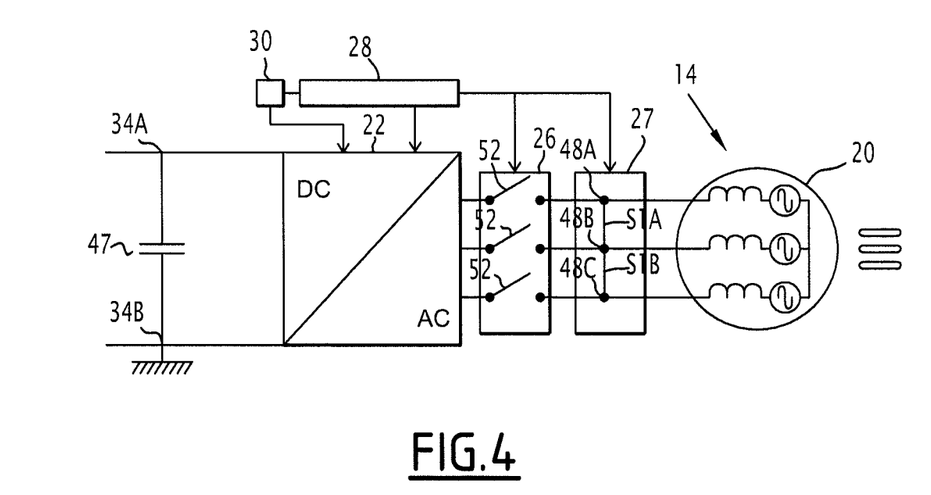
FIG. 4 is a view similar to that of FIG. 3, during a step for short-circuiting the power supply outputs of the feed chain.

As illustrated by FIG. 4, the switches S1A, S1B close in the following step 74, the switches 52 remaining open. The instruction 62A to close the switches S1A, S1B of the contactor 27 is maintained by the software 60 for a symmetrization time. The three phases A, B, C of the electric machine 14 are then short-circuited. The electric machine is protected from the electrical defect and continues to operate throughout the entire symmetrization time according to a rated mode known in itself. The symmetrization step 74 ends by stopping the rail vehicle and/or the intervention of an operator responsible for ensuring repairing the electric traction system 10. Throughout the entire duration of the step 74, i.e., throughout the symmetrization time, the electric machine 14 continues to operate, but goes from a "motor" operating mode to an "alternator" operating mode in which the electric machine is driven by the wheels of the rail vehicle.

Alternatively, between the step 66 and the step 68, the controller 28 advantageously commands closing of the short-circuiting device 40 connected to the same input terminal 34A, 34B, according to a symmetrization method known in itself. The short-circuiting means 40 are electric switches, for example three.

This closing, by the controller 28, of the switches 40 connected to the same input terminal 34A, 34B on the one hand makes it possible to facilitate opening of the switches 52 of the insulating device 26, and on the other hand to rebalance the currents circulating in the electric machine 14.

One can see that, following the detection of a short-circuit inside the electric machine 14, this control method makes it possible to reduce the amplitude of the pulsed torques and the short-circuit currents in the electric machine throughout the entire symmetrization time.

Furthermore, this control method makes it possible to greatly reduce the losses in the inverter 22, since it does away with any command from the inverter 22 to short-circuit the phases of the electric machine.

This embodiment is the preferred embodiment of the invention.

In an alternative embodiment, not shown, the detector 30 is arranged at the output of the short-circuiting device 27 and connected to the electric machine 14. The detector 30 is also connected, according to this alternative embodiment, to the computer installed in the controller 28, and are capable of measuring the phase currents of the machine 14 at any moment.

The operation of the feed chain 16 according to this alternative embodiment is described by the same steps 66 to 72, corresponding to the operation of the preferred embodiment. Unlike the preferred embodiment, during the symmetrization step 74, the detector 30 measures the phase currents of the machine 14 at all times. As long as an imbalance exists between those phase currents, the instruction 62A to close the switches S1A, S1B of the contactor 27 is maintained and the three phases A, B, C of the electric machine 14 remain short-circuited. If the measurements of the currents supplied by the detection means 30 indicate that the balance is reestablished, during an additional step, the processor 58 selects the instruction 62B to close the switches S1A, S1B. The software 60 executes this instruction to close the switches S1A, S1B and the feed chain 16 returns to the configuration illustrated in FIG. 3.

Also alternatively, not illustrated, the short-circuiting device 27 is arranged between the converter 22 and the insulating device 26. The insulating device 26 is then connected to the electric machine 14. According to this alternative embodiment, the short-circuiting device 27 is for example a two-way contactor, or a circuit breaker.

The operation of the feed chain 16 according to this alternative embodiment is described by the same steps 66 to 72, corresponding to the operation of the preferred embodiment. These steps are therefore not described again. Unlike the preferred embodiment, during the symmetrization step 74, the switches 52 do not remain open. More specifically, after closing of the switches S1A, S1B of the contactor 27, the processor 58 selects, within the control law, an instruction to close the switches 52. Software 60 executes that instruction to close the switches 52 and the switches 52 close.

Figure 6:
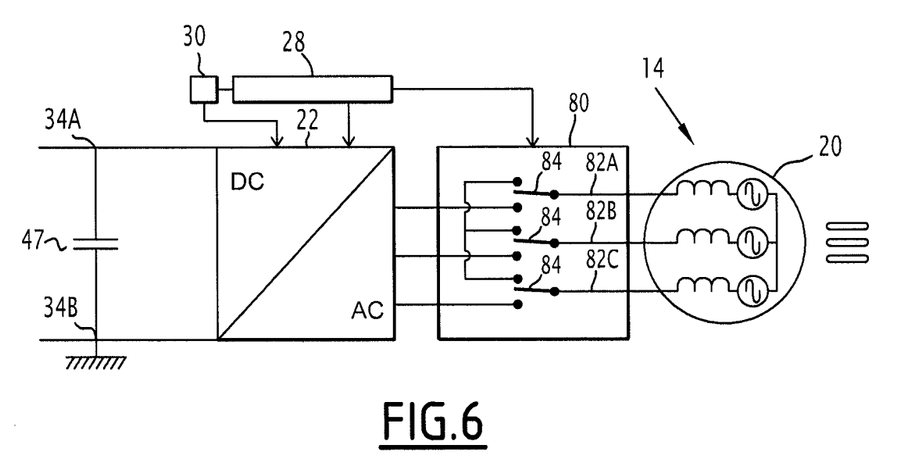
FIG. 6 is a diagrammatic illustration of the feed chain of FIG. 1 according to one alternative embodiment of the invention.

In still another alternative, illustrated in FIG. 6, the insulating device and the short-circuiting device are located in the same housing 80. The short-circuiting device 80 is then in this example an insulating contactor with three states. The insulating contactor 80 is for example a vacuum tube contactor.

The insulating contactor 80 comprises M switching branches 82, each switching branch 82 being connected between an output terminal 36 of the converter 22 and one of the M phases of the stator 20 of the electric machine 14.

In the example embodiment of FIG. 6, the number M of phases is equal to three. The insulating contactor 80 includes three branches 82: a first branch 82A, a second branch 82B, and a third branch 82C.

Each branch 82A, 82B, 82C includes a three-state switch 84.

Each switch 84 is capable of switching, following an electronic control signal applied across its terminals, between a first state, a second state, and a third state. The first state, illustrated in FIG. 6, corresponds to electrical insulation between the electric machine 14 and the converter 22. The second state corresponds to an electrical connection between the electric machine 14 and the converter 22. The third state corresponds to an electrical connection between the outputs 31 of the chain 16.

The controller 28 is connected to each switch 84 of the insulating contactor 80 and is capable of sending control signals to said switches 84.

The operation of the feed chain 16 according to this alternative embodiment is similar to that of the preferred embodiment, and is therefore not described again.

Figure 7:
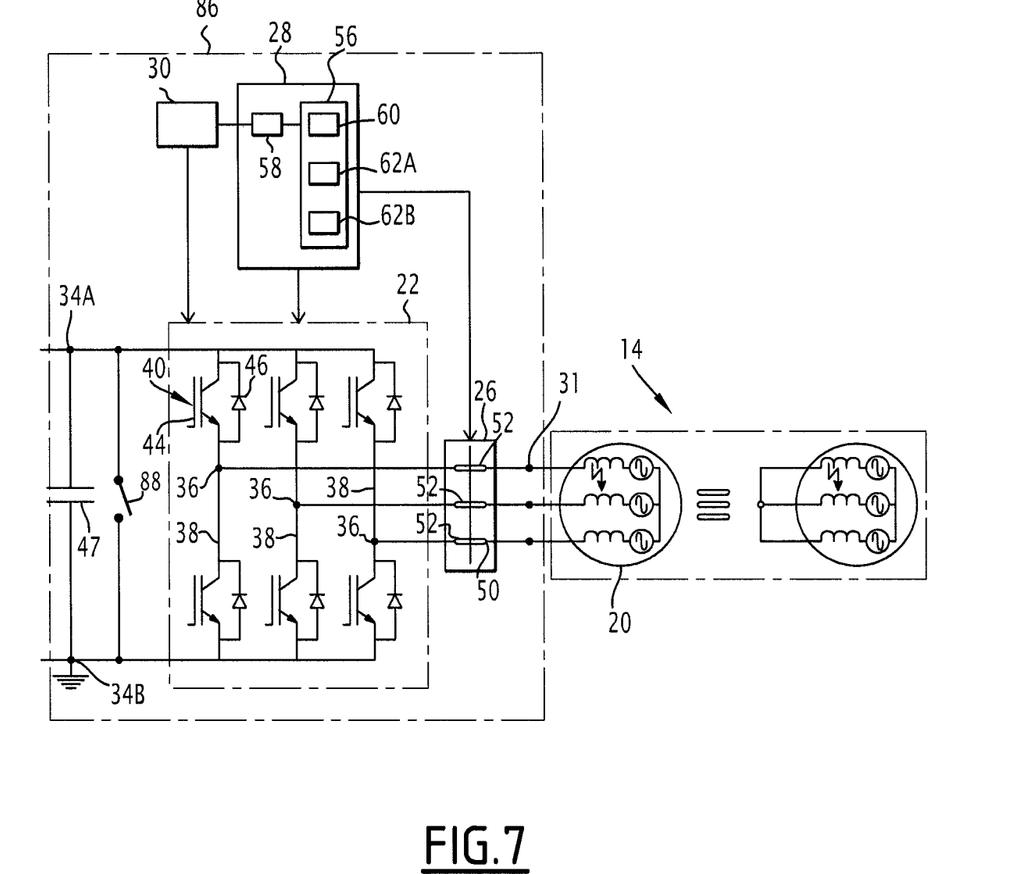
FIG. 7 is an electric diagram of a feed chain according to a second embodiment of the invention.

FIG. 7 illustrates a second embodiment of the invention, for which the elements similar to the first embodiment previously described are identified using identical references.

According to the second embodiment, the electric traction system 10 comprises a synchronous electric machine 14 and a feed chain 86 of the machine.

The feed chain 86 comprises a short-circuiting device 88 for short-circuiting the phases of the electric machine 14, arranged between the storage bank 24 and the converter 22. More specifically, the short-circuiting device 88 is arranged between the capacitor 47 and the converter 22.

The short-circuiting device 88 is, in this example, a switch. The switch 80 is connected in parallel to the capacitor 47, between the two input terminals 34A, 34B.

The control law comprises an instruction 90A to close the switch 88, and an instruction 90B to open the switch 88.

The operation of the feed chain 86 according to the second embodiment of the invention will now be explained.

In an initial configuration, the switches 52 are closed, and the switch 88 is open. The converter 22 and the electric machine 14 are electrically connected by means of the insulating device 26. An alternating current is delivered by the converter 22 to the stator 20 of the electric machine 14 on each of its phases A, B, C.

When a short-circuit inside or outside the electric machine 14 occurs, the detection means 30 detect, during a step, an overcurrent in the currents circulating in the switching branches 38 of the converter 22.

During a following step, if the short-circuit is inside the electric machine 14, the control means 28 command opening of the six electric switches 40 of the converter 22. The processor 58 then selects, within the control law, the instruction 90A to close the switch 88. The software 60 executes said instruction 90A.

The switch 88 then closes during a following step, the switches 52 remaining closed. The instruction 90A to close the switch 88 is maintained by the software 60 during the symmetrization time.

The feed chain according to the invention thus makes it possible to reduce the amplitude of the pulsed torques and the short-circuit currents created within the electric machine, when the short-circuit appears inside the electric machine, and to thereby avoid the appearance of an unwanted phenomenon.

What is claimed is:

1. A feed chain having M feed outputs for supplying a synchronous electric machine with M phases, M being an integer greater than 1, the chain comprising:
    a converter for converting a direct input current into a polyphase alternating output current including a plurality M of phases, the converter comprising two input terminals and M output terminals and M switching branches, and capable of delivering the polyphase alternating current to said electric machine,
    a storage bank including at least one storage capacitor arranged between the input terminals of the converter,
    a detector for detecting a short-circuit outside or inside the electric machine, by measuring currents circulating in the switching branches of the converter,
    an insulator device for insulating the electric machine from overvoltages and/or overcurrents of the polyphase alternating current, the insulator device being arranged between the converter and the M feed outputs, and including a plurality M of branches, each branch including at least one electric switch for disconnecting the considered phase, arranged between the converter and one of the M outputs, and
    a controller for controlling the converter and the insulator device, the controller opening the insulator device when a short circuit is detected by the detector,
    wherein the detector is also configured to determine whether a detected short-circuit is a short-circuit inside the electric machine, by means of temperature sensors for measuring the temperature of the air inside the electric machine, the feed chain also including a short-circuiting device capable of connecting the M power supply outputs to each other when a short-circuit inside the electric machine is determined, the controller being capable of commanding the short-circuiting device to perform that operation.

2. The feed chain according to claim 1, wherein the short-circuiting device is arranged between the converter and the M power supply outputs.

3. The feed chain according to claim 1, wherein the insulating device and the short-circuiting device are located in the same insulating contactor, the insulating contactor including M electronic switches, each switch being connected between an output terminal of the converter and one of the M phases of the electric machine, each switch having three possible switching states, in a first state the electric machine and the converter are isolated one from the other, in a second state the electric machine and the converter are electrically connected, and in a third state the power supply output terminals are connecting to each other.

4. The feed chain according to claim 1, wherein the short-circuiting device is arranged between the storage bank and the converter.

5. The feed chain according to claim 1, wherein the controller and the detector share a same computer situated within the controller.

6. The feed chain according to claim 1, wherein the number M of phases is equal to three.

7. An electric traction system comprising a synchronous electric machine and a feed chain of the machine, wherein the feed chain is according to claim 1, and is capable of feeding a stator of the electric machine, the stator being connected as output to the feed chain.

8. A control method for a feed chain according to claim 1, comprising a step for detecting a short-circuit outside or inside the electric machine by measuring currents circulating in the switching branches of the converter, and when a short-circuit is detected, a step of opening the at least one switch of the insulator device to isolate the electric machine from the converter, wherein the method further comprises the step for determining whether a detected short-circuit is a short-circuit inside the machine by measuring the temperature of the air inside the electric machine, using the temperature sensors, wherein, if the short-circuit detected during the detection step is inside the electric machine, it comprises a step for short-circuiting, using the short-circuiting device, the M phases of the electric machine, by electrical connection between the M power supply outputs of the chain.

\* \* \* \* \*